Patented Mar. 11, 1941

2,234,381

UNITED STATES PATENT OFFICE 2,234,381

INSECTICIDE

Clarence L. Moyle and Gerald H. Coleman, Midland, Mich., assignors to The Dow Chemical Company, Midland, Mich., a corporation of Michigan No Drawing. Application February 21, 1940, Serial No. 320,160

13 Claims. (Cl. 167—22)

This invention relates to insecticidal products and is particularly concerned with compositions adapted for the control of household insect pests.

Many organic toxicants have been suggested for inclusion in mothproofers and liquid household insecticides. Certain compositions employed for the control of moths have been unsatisfactory in that the residues therefrom are of such a crystalline nature as to stiffen or be dusted out of fabric materials. Other mothproofing toxicants and particularly ether compounds are highly volatile and impermanent in nature and are soon dissipated by vaporization from the material to which they are applied. Also, temporary protection only is accomplished by compounds which are soluble in water or which decompose on weathering. Many ether compounds are characterized by having a sharp and undesirable odor which is irritating to the nose and throat and are also corrosive to the skin.

Petroleum distillate sprays comprising insecticidal plant products are widely used for the control of household insect pests. Pyrethrin-containing sprays have a quick paralyzing effect on flies, but the kill obtained is low compared with the knockdown of the insects. Sprays comprising rotenone have been found to give a high moribund kill but have a relatively slow rate of knockdown. A further disadvantage in the use of rotenone- or pyrethrin-containing compositions is that these toxicants are very unstable to heat and light, and upon storage lose their effectiveness to an appreciable degree.

We have discovered that unsaturated ether compounds having the formula

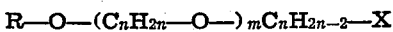

are effective insecticidal toxicants. In this formula R represents an aromatic radical, X represents chlorine, bromine, or hydrogen, $m$ is an integer not greater than 4, and $n$ is an integer not greater than 6. These compounds are for the most part viscous, water-white liquids or low-melting solids. They are somewhat soluble in most common organic solvents, and substantially insoluble in water. When employed in various insecticidal compositions, the compounds are both toxic and repellant to common household insect pests and are particularly valuable in the control of house flies, clothes moths, and carpet beetles.

The new synthetic ether toxicants may be employed at concentrations of from about 2 to 10 per cent by weight dispersed in non-corrosive organic solvents. While such compositions have been found to be non-irritating and relatively non-toxic to higher forms of animal life, they give quick knockdowns and high kills when employed as fly sprays, and compositions containing them are relatively stable on exposure to air, light, and heat. These unsaturated ethers may also be employed to fortify pyrethrum- or rotenone-containing sprays, whereby increased kills on flies and related insects are obtained therewith. A further advantage in the use of the combination of toxicants is that the ether compound exerts a stabilizing effect upon the plant toxicant. The amount of the ether compound preferably employed in combination with the naturally-occurring insecticidal plant products varies between about 5 and 50 grams per liter of spray solution.

In the protection of fur, hair, feathers, and wool, against the attack of clothes moths, carpet beetles, and related insects, solutions or dispersions containing from about 0.5 to about 15 per cent by weight of the unsaturated ether compound are employed. Fabrics impregnated with such solutions and thereafter dried are protected for a long period of time against attack by such insects, and are not stained or caused to develop objectionable odors, or to become toxic to humans. Furthermore, the ether residues deposited in and on the fibers are not readily removed from the fabric by the action of water, or by weathering, or dissipated by volatilization and sublimation.

The following examples are illustrative of certain modes in which the invention may be applied but are not to be construed as limiting the same.

Example 1

Mothproofing tests were carried out with solutions of alkenyl and halo-alkenyl ethers of aryloxy-alkanols in various organic solvents to determine their efficiency against the larvae of the black carpet beetle (Attagenus piceus). This insect and its larvae attack woolens, furs, and the like and are particularly destructive to fabrics used in upholstered furniture and to woolen carpets and rugs. It is more hardy than the common casemaking clothes moth or tapestry moth, and concentrations of materials found suitable for beetle control are generally effective against moths.

A number of samples of white wool cloth were saturated with a 4 per cent solution of a beta-(2-cyclohexyl-phenoxy)-ethyl vinyl ether (boiling at 160° C. at 5 millimeters pressure) in methyl-ethyl ketone, thereafter pressed to remove excess treating solution and dried. On each of a number of these samples, five larvae of the black carpet beetle were placed and the samples folded over the larvae. These infested cloth samples were placed in a closed cardboard box and examined from time to time to determine the amount of feeding or other attack directly attributable to the beetle larvae. Similar tests were carried out on untreated pieces of woolen cloth, both control and test samples being incubated after infestation at a temperature of 85°–90° F. and a relative humidity of 70–75 per cent. Examination of the incubated samples impregnated with the beta-(2-cyclohexylphenoxy)-ethyl vinyl ether solution, showed that after three weeks there had been no feeding by the larvae and that 100 per cent of the test larvae were dead. The untreated controls showed heavy feeding throughout the incubation period with a 100 per cent survival of the test larvae. Determinations carried out over the same period upon cloth impregnated with methyl-ethyl ketone alone showed feeding by the larvae throughout the incubation period.

In other determinations, comparable results were obtained with 4 per cent solutions of beta-(X-methylphenoxy)-ethyl vinyl ether (boiling at 120°–123° C. at 6 millimeters pressure), beta-(2-xenoxy) ethyl vinyl ether (boiling at 163°–167° C. at 5.5 millimeters pressure), and beta-(2-chloro-4-tertiarybutyl-phenoxy)-ethyl vinyl ether (boiling at 158° C. at 7 millimeters pressure), each of which prevented the feeding of the moths over a period of three weeks, and which gave kills of 40, 100, and 100 per cent, respectively, of the test larvae.

Likewise, solvent solutions of other and related unsaturated ether compounds were employed in the treatment of woolens and similar materials subject to attack by moths. Materials subjected to such treatment were moth-proofed for an extended period of time without being stained or damaged by the mothproofing toxicant, and even after prolonged weathering showed no discoloration and developed no objectionable odor attributable to the toxicant. The toxicants showed no tendency to crystallize or be dusted out of the fabric.

Other solvents which may be employed in preparing treating solutions, as described above, are highly refined petroleum distillates; liquid halogenated hydrocarbon compounds, such as carbon-tetrachloride, chloroform, ethylene chloride, dichloro-ethylene, chlorobenzene, and the like; hydrocarbon compounds such as benzene, lower paraffin hydrocarbons, and toluene; lower aliphatic alcohols such as methyl, ethyl or propyl alcohol; etc. If desired, the new ether toxicants may be applied to the material to be mothproofed as constituents of emulsions comprising suitable wetting, emulsifying, or detergent agents and water.

*Example 2*

2.5 grams of beta-(4-xenoxy)-ethyl vinyl ether (melting at 73°–76° C.) was dissolved in sufficient of a petroleum distillate fraction (boiling at 345°–508° F. and having a flash point of 137° F.) to give 100 milliliters of solution. This solution was employed as a spray composition against 3-day-old house flies, according to the Peet Grady method and substantially as described in Soap 8, No. 4, 1932. The composition was found to knock down 55 per cent of the flies in 10 minutes and to kill 34 per cent in 48 hours. A determination was also carried out on a petroleum distillate solution comprising 2.5 grams of beta-(2-xenoxy)-ethyl vinyl ether per 100 milliliters of solution. This composition knocked down 98 per cent of the flies in 10 minutes and killed 29 per cent in 48 hours. The freshly-prepared test solutions were substantially odorless and did not appreciably deteriorate with respect to insecticidal effectiveness on storage and exposure to light and air, and did not stain surfaces on which they were sprayed.

Mixtures of the foregoing and related compounds, as well as homologs and analogs thereof, wherein the unsaturated etherifying group contains halogen, may also be employed to obtain liquid spray materials having desirable characteristics as regards insecticidal toxicity, speed and percentage of knockdown and kill, and resistance to deterioration. Likewise, these compounds may be employed to fortify and stabilize extracts of pyrethrum flowers, derris, cube, barbasco, and similar insecticidal plant products.

Besides petroleum distillates, solvents such as benzene, ethylene chloride, hydrogenated naphthalene, butyl alcohol, and the like may be employed in the spray compositions. The phrase "non-corrosive organic solvent," as herein employed, refers to any organic solvent material unreactive with and capable of dissolving the toxicants hereinbefore described and non-injurious to the skin and general health of humans.

A further embodiment of the invention consists of emulsions and dispersions adapted for use in the control of agricultural pests and comprising the new ether toxicants. Our new ether compounds or mixtures thereof may be dispersed with water in the presence of suitable emulsifying or wetting agents such as blood albumin, sulphonated alcohols, sulfonated aromatic hydrocarbons, or salt thereof, and applied for the control of such insects as aphis, potato beetle, and the like. If desired, the ether compound may be first dissolved in a petroleum distillate or other solvent and such solution subsequently incorporated into an oil-water emulsion composition. Such compositions may be applied advantageously for the control of various scale insects.

The unsaturated ether toxicant may also be dispersed in or on a solid inert carrier such as bentonite, diatomaceous earth, wood flour, etc. to form compositions adapted to be employed either as dusts or as spray toxicants if dispersed in water. Any suitable concentration of the toxicant within the tolerance of the particular plant to be contacted may be employed in such composition.

Other compounds which may be employed substantially as set forth in the foregoing examples are beta-(4-tertiary-butylphenoxy)-ethyl vinyl ether, boiling at 142°–145° C. at 8 millimeters pressure; beta-(4-chloro-phenoxy)-ethyl vinyl ether, melting at 48.5°–49.5° C.; mixed beta-phenoxy-ethyl and phenoxy-propyl allyl ethers, as prepared from the corresponding commercial mixtures of phenoxy-ethanol and phenoxy-propanol, boiling at 120°–123° C. at 10 millimeters pressure; beta-(2.4.6-trichloro-phenoxy)-ethyl allyl ether, boiling at 170°–171° C. at 10 millimeters pressure; beta-(2-toloxy)-ethyl allyl ether, boiling at 117°–121° C. at 6 millimeters pressure; beta-(4-chlorophenoxy)-ethyl allyl ether, boiling at 160°–161° C. at 20 millimeters pressure; 4-cyclohexyl-phenoxy-propyl allyl ether, boiling at 152°–154° C. at 2 millimeters pressure; beta-(4-tertiarybutylphenoxy)-beta'-allyloxy-diethyl ether, boiling at 170°–178° C. at 6.5 millimeters pressure; beta-(2-toloxy)-ethyl 2-methallyl ether, boiling at 123°–128° C. at 6 millimeters pressure; (beta-2-toloxy-ethyl) 2-chloroallyl ether, boiling at 128°–134° C.; and other compounds such as (aryloxy-ethyl) (2-bromo-allyl) ethers, (aryloxy-ethyl) propenyl ethers, (aryloxy-ethyl) butenyl ethers, (aryloxy-ethyl) pentenyl ethers, (aryloxy-ethyl) hexenyl ethers, (aryloxy-ethyl) (2-chloro-butenyl) ethers, (aryloxy-propyl) vinyl ethers, (aryloxy-butyl) vinyl ethers, (aryloxy-pentyl) vinyl ethers, (aryloxy-hexyl) vinyl ethers, beta-aryloxy-beta'-vinyloxy-diethyl ethers, gamma-aryloxy-gamma'-(2-chloro-allyloxy)-dipropyl ethers, beta-aryloxy-beta'-(2-methallyloxy)-ethyl-propyl ethers, beta-(aryloxy-ethoxy)-beta-allyloxyl-diethyl ethers, gamma-(aryloxy-propoxy)-gamma'-vinyloxy-dipropyl ethers, beta-(aryloxy-ethoxy)-beta'-(propenyloxy-ethoxy)-diethyl ethers, and the like. Representative of the numerous phenols from which the foregoing derivatives may be prepared are 2.4-dimethyl-phenol, 2-methyl-5-isopropyl-phenol, 4-benzyl-phenol, 2-methoxy-phenol, 2.4-dinitro-6-methyl-phenol, 4-octadecanyl-phenol, 4-allyl-phenol, 2-chloro-4-phenyl-phenol, 2.4.6-tribromo-phenol, pentachloro-phenol, 4-iodo-phenol, alphanaphthol, 4-chloro-alpha-naphthol, and tetrahydro-naphthol.

One method for the preparation of the compounds with which this application is concerned consists of reacting a suitable (monohalo-alkyl) (alkenyl) ether or (monohalo-alkyl) (halo-alkenyl) ether with a phenol in the presence of an alkali and water. According to this method, the reactants are mixed together and heated in a closed reactor under autogenous pressure. Temperatures ranging between about 100° and 175° C. are preferred, although somewhat higher or lower temperatures may be employed, depending upon the particular reactants concerned. When equimolecular proportions of the ether, alkali, and phenol are reacted together, the desired compound is produced in good yield. Optimum results are obtained when an excess of the (monohalo-alkyl) (alkenyl) ether is employed in the reaction mixture. The concentration of the alkali present in the reaction zone is not critical, although a solution of from 5 to 30 per cent by weight is generally employed. Following completion of the reaction, the reactor and contents are cooled and the crude product washed with dilute alkali and fractionally distilled to separate out the desired ether compound.

An alternate procedure consists of reacting the sodium salt of an aryloxy-alkanol or aryloxy-polyalkylene-ether-alcohol with an alkenyl or halo-alkenyl-halide. This reaction is conveniently carried out by dispersing substantially equi-molecular proportions of the reactants in an inert organic solvent and heating the mixture to its boiling temperature under reflux. Following completion of the reaction, the crude product is washed and fractionally distilled in the usual manner. This procedure has been found adapted to the preparation of those ether compounds wherein the alkenyl or halo-alkenyl radical contains at least three carbon atoms.

Our co-pending application, Serial No. 317,316, filed February 5, 1940, discloses the preparation and properties of a number of the compounds as set forth in the foregoing examples.

Other modes of applying the principle of our invention may be employed instead of those explained, change being made as regards the materials employed, provided the product described in the following claims be thereby obtained. We therefore particularly point out and distinctly claim as our invention:

1. An insecticidal composition containing as a toxic ingredient an unsaturated ether compound having the formula

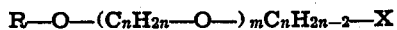

wherein R represents an aromatic radical, X represents a member of the group consisting of chlorine, bromine, and hydrogen, m is an integer not greater than 4, and n is an integer not greater than 6.

2. An insecticidal composition comprising a non-corrosive organic solvent having dissolved therein as an active toxicant an unsaturated ether compound having the formula

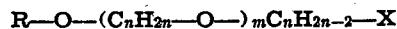

wherein R represents an aromatic radical, X represents a member of the group consisting of chlorine, bromine, and hydrogen, m is an integer not greater than 4, and n is an integer not greater than 6.

3. An insecticidal composition comprising a non-corrosive organic solvent having dissolved therein an unsaturated ether compound having the formula

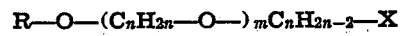

wherein R represents an aromatic radical, X represents a member of the group consisting of chlorine, bromine, and hydrogen, m is an integer not greater than 4, and n is an integer not greater than 6, and as an added toxicant, a product selected from the class consisting of the extracts of pyrethrin and rotenone bearing plants.

4. A composition consisting of material liable to attack by moths, having incorporated therein an unsaturated ether compound having the formula

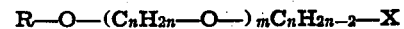

wherein R represents an aromatic radical, X represents a member of the group consisting of chlorine, bromine, and hydrogen, m is an integer not greater than 4, and n is an integer not greater than 6.

5. An insecticidal composition containing as a toxic ingredient an unsaturated ether compound having the formula

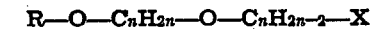

wherein R represents an aromatic radical, X represents a member of the group consisting of chlorine, bromine, and hydrogen, and n is an integer not greater than 6.

6. A composition consisting of material liable to attack by moths, having incorporated therein an unsaturated ether compound having the formula

wherein R represents an aromatic radical, X represents a member of the group consisting of chlorine, bromine, and hydrogen, and n is an integer not greater than 6.

7. An insecticidal composition containing as a toxic ingredient an unsaturated ether compound having the formula

wherein R represents an aromatic radical and n is an integer not greater than 6.

8. An insecticidal composition comprising a non-corrosive organic solvent having dissolved therein as an active toxicant an unsaturated ether compound having the formula

wherein R represents an aromatic radical, and $n$ is an integer not greater than 6.

9. A composition consisting of material liable to attack by moths, having incorporated therein an unsaturated ether compound having the formula $$R\!-\!O\!-\!C_2H_4\!-\!O\!-\!C_nH_{2n-1}$$

wherein R represents an aromatic radical, and $n$ is an integer not greater than 6.

10. An insecticidal composition containing as a toxic ingredient a compound having the formula $$R\!-\!O\!-\!C_2H_4\!-\!O\!-\!CH\!=\!CH_2$$

wherein R represents an aromatic radical.

11. An insecticidal composition comprising a non-corrosive organic solvent having dissolved therein as an active toxicant a compound having the formula $$R\!-\!O\!-\!C_2H_4\!-\!O\!-\!CH\!=\!CH_2$$

wherein R represents an aromatic radical.

12. A composition consisting of material liable to attack by moths, having incorporated therein a compound having the formula $$R\!-\!O\!-\!C_2H_4\!-\!O\!-\!CH\!=\!CH_2$$

wherein R represents an aromatic radical.

13. An insecticidal composition containing as a toxic ingredient a compound having the formula $$R\!-\!O\!-\!C_2H_4\!-\!O\!-\!CH_2\!-\!CH\!=\!CH_2$$

wherein R represents an aromatic radical.

CLARENCE L. MOYLE.
GERALD H. COLEMAN.